United States Patent
Bauman

[15] 3,699,426
[45] Oct. 17, 1972

[54] HIGH ISOLATION A.C. TO D.C. CONVERTER

[72] Inventor: Ronald M. Bauman, 415 Saratoga Drive, Cherry Hill, N.J. 08034

[22] Filed: May 20, 1971

[21] Appl. No.: 145,364

[52] U.S. Cl. ..................... 321/27 R, 320/1, 321/47
[51] Int. Cl. .............................................. H02m 7/20
[58] Field of Search ............ 321/8, 27 R, 45 R, 47, 4; 331/117; 320/1

[56] References Cited

UNITED STATES PATENTS

| | | | |
|---|---|---|---|
| 3,360,710 | 12/1967 | Barthold | 321/4 |
| 3,596,369 | 8/1971 | Dickerson et al. | 321/47 X |
| 3,197,690 | 7/1965 | Ball | 320/1 |
| 3,371,261 | 2/1968 | Hull et al. | 321/45 R |
| 3,323,076 | 5/1967 | Pelly | 331/117 |

Primary Examiner—William H. Beha, Jr.
Attorney—R. S. Sciascia and Thomas O. Watson, Jr.

[57] ABSTRACT

The invention converts alternating current (A.C.) power to direct current (D.C.) power and achieves high isolation between the A.C. source and D.C. load without the use of a high power transformer. The invention achieves high isolation by the use of capacitors, diodes, and silicon controlled rectifiers (SCR) which are so arranged that an effectively open circuit is constantly maintained between the A.C. source and the D.C. load. The invention also makes use of a small low power phasing transformer connected across the A.C. source to render the SCR's conductive or nonconductive at the appropriate times.

5 Claims, 1 Drawing Figure

PATENTED OCT 17 1972   3,699,426
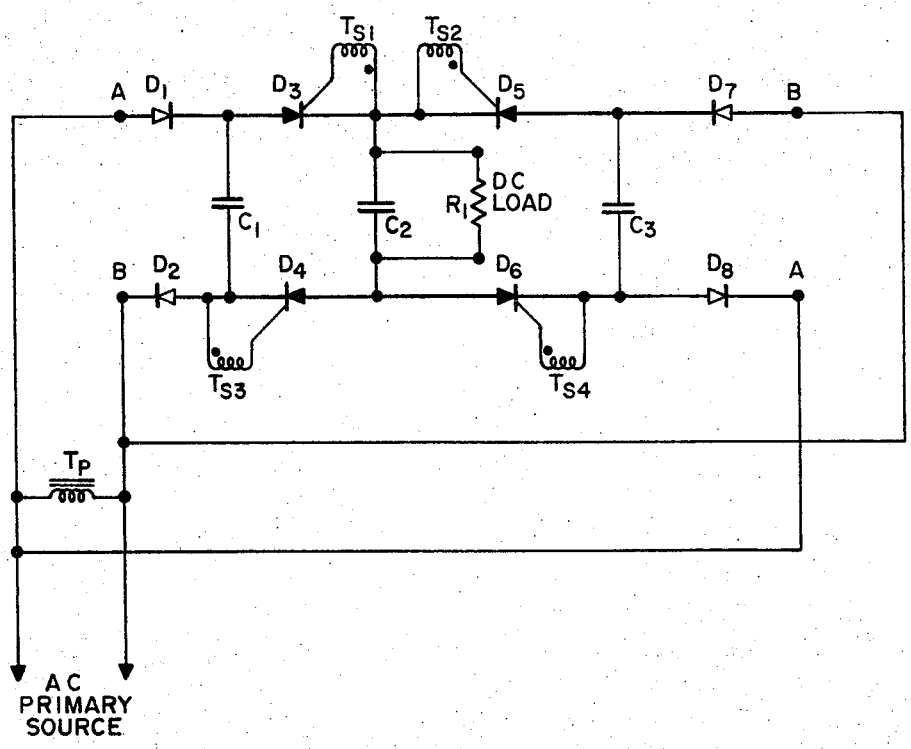
INVENTOR.
RONALD M. BAUMAN
BY Thomas O. Watson Jr.
ATTORNEY

HIGH ISOLATION A.C. TO D.C. CONVERTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to A.C. to D.C. converters and more particularly to a solid state A.C. to D.C. converter that achieves high isolation without the use of a high power transformer.

2. Description of the Prior Art

The conventional circuit for converting A.C. power to D.C. power employs a high power transformer, a half wave or full wave rectifier circuit and a filter for eliminating or reducing the ripple. The invention eliminates the use of the high power transformer which is usually the most expensive, largest, and heaviest component of the A.C. to D.C. converter. Other conventional devices that eliminate the high power transformer from the converter circuit do not provide the necessary high isolation between the A.C. primary source and the D.C. load and thus are very dangerous to human handlers. For this reason these latter devices are seldom used.

SUMMARY OF THE INVENTION

The inventive converter eliminates the bulky, expensive, high power transformer while maintaining high isolation between the A.C. source and the D.C. load. This high isolation is achieved by the inventive converter circuit by a unique arrangement of components wherein a charged capacitor is temporarily disconnected from the circuit and, thus, from the A.C. source while it is delivering load power to the D.C. load. While one charged capacitor, which has been disconnected from the circuit, is discharging into the D.C. load, another capacitor, which is at that moment connected into the circuit, is being charged by the A.C. source. During the following half cycle of the A.C. source power, the roles of these two capacitors are reversed by the inventive circuit. The switching of the inventive converter circuit is achieved through a unique arrangement of diode and SCR gates, individual ones of which are conductive only during one half cycle of the A.C. source power.

OBJECTS OF THE INVENTION

An object of the present invention is the provision of a new and unique A.C. to D.C. power converter.

Another object of the invention is to achieve high isolation between the A.C. source and the D.C. load without the use of a high power transformer.

Other objects, advantages and novel features of the present invention will become apparent from the following detailed description of the invention when considered in conjunction with the accompanying drawings.

BRIEF DESCRIPTION OF THE DRAWING

The single FIGURE of the drawing is a circuit diagram of a preferred embodiment of the inventive A.C. to D.C. converter.

DETAILED DESCRIPTION OF THE PREFERRED EMBODIMENT

In the single figure, the A.C. source is connected to nodes A and B. A small, low power, phasing transformer is connected across the A.C. source and senses the phase or polarity of the A.C. signal. $T_P$ represents the primary winding of the phasing transformer. $T_{S1}$, $T_{S2}$, $T_{S3}$, and $T_{S4}$ designate the four secondary windings of the phasing transformer. The phasing of the secondary windings is in accordance with the dot convention as shown in FIG. 1. One side of the A.C. source is connected to two terminals or nodes both designated A. The other side of the primary source is similarly connected to two terminals or nodes both designated B. Thus, the current in each side of the A.C. source has two possible paths to travel. However, due to the arrangement of diodes D1, D2, D7, and D8, the current in each side of the A.C. primary source can only follow one path through the circuit during each half cycle of the A.C. source power. During the alternate half cycle, the current in each side of the A.C. source will follow the alternate path through the circuit.

During the half cycles in which the nodes A are positive with respect to nodes B, diodes $D_1$ and $D_2$ conduct current from the A.C. source to capacitor $C_1$ and charge it to peak line voltage. Capacitors $C_1$, $C_2$, and $C_3$ are preferably electrolytic capacitors, although nonelectrolytic capacitors could be used. Since they are reversed biased, diodes $D_7$ and $D_8$ are nonconductive at this moment in time. Similarly, SCR's $D_3$ and $D_4$ are nonconductive since their respective gate to cathode voltages are reverse biased by $T_{S1}$ and $T_{S3}$, respectively. SCR's $D_5$ and $D_6$ are now conductive since the phasing of $T_P$, $T_{S2}$ and $T_{S4}$ is such that the cathodes of these SCR's are negative with respect to their gates. Assuming capacitor $C_3$ has been charged through diodes $D_7$ and $D_8$ on the previous half cycle of the A.C. source power (when nodes B were positive with respect to nodes A), current from $C_3$ will now be conducted to capacitor $C_2$ through $D_5$ and $D_6$. The D.C. load $R_1$ now receives energy from capacitor $C_2$.

Assume now that nodes B are positive with respect to nodes A. At this moment in time, diodes $D_1$ and $D_2$ are rendered nonconductive since they are reversed biased; and SCR's $D_3$ and $D_4$ are conductive due to the phasing of the transformer windings $T_P$, $T_{S1}$ and $T_{S3}$. Capacitor $C_1$ having been charged to peak line voltage during the previous half cycle of the A.C. source power when nodes A were positive with respect to nodes B will now discharge its energy into capacitor $C_2$ and from there into the D.C. load $R_1$. With a D.C. load connected across capacitor $C_2$, the voltage across $C_2$ and also across capacitor $C_3$ will be less than the peak A.C. source voltage. When SCR's $D_3$ and $D_4$ are rendered conductive by transformer windings $T_P$, $T_{S1}$ and $T_{S3}$, the voltage across capacitor $C_2$ will for an instant rise higher than the voltage across capacitor $C_3$ and thus assure that SCR's $D_5$ and $D_6$ are rendered nonconductive. It should be noted that at no time is there a direct current path from the D.C. load to the A.C. source.

When the ideal switch is in the open state it has an infinite impedance. Diodes and SCR's when in the nonconductive or open state have impedances ranging from the megaohm region to the hundredths of megohm region. Therefor, currents in the order of nanoamps will flow from the A.C. source to the D.C.

load. However, conventional high power transformers have inductive leakages which result in small currents flowing from the D.C. load to the A.C. source. Careful design, however, can reduce these leakage currents to values small enough that they do not interfere with circuit operation and do not present a hazard to human beings. Correspondingly, diodes and SCR's can be selected which have reverse biased leakage currents small enough to maintain effective high isolation between the A.C. source and the D.C. load thereby eliminating any hazard to human handlers.

Obviously, many modifications and variations of the present invention are possible in light of the above teachings. For instance, the silicon controlled rectifiers could be replaced by silicon controlled switches which provide more positive turn-off characteristics. A ground leakage current sensing device could be added to the circuit which would automatically disconnect the D.C. load from the circuit in the event of a failure of a diode or of an SCR. The basic idea of a load drawing current from a charged capacitor which has been disconnected from the source could be employed with voltage doubler, tripler or quadtrupler circuits to boost voltage and thereby provide step-up action. Step-down action could be accomplished by proper choice of capacitors $C_1$ and $C_3$ in relation to capacitor $C_2$. Further, a silicon solar cell coupled to the A.C. source through photons from a neon bulb could be used in place of the small phasing transformer. Thus, it is to be understood that, within the scope of the appended claims, the invention may be practiced otherwise than specifically described.

What is claimed is:

1. A high isolation A.C. to D.C. converter comprising:

input means for receiving a signal from an A.C. source;

output means for transmitting the output of the converter to a D.C. load;

first and second means, connected to said input means, for providing half-wave rectification;

first and second energy storing means connected to said first and second half-wave rectification means respectively;

third energy storing means connected across the D.C. load;

a plurality of gate controlled switching means connected between first and third energy storing means and between said second and third energy storing means; and, a small, low power, phasing transformer having a primary winding connected across the A.C. source and a plurality of secondary windings individually connected to the gate electrode of each of said gate controlled switching means, the relative phase of the secondary windings being such that the first and second energy storing means are individually and alternately connected to said third energy storing means through said switching means at the frequency of the A.C. source.

2. The converter of claim 1 wherein the energy storing means comprise a plurality of electrolytic capacitors.

3. The converter of claim 1 wherein the gate controlled switching means are silicon controlled rectifiers.

4. The converter of claim 1 wherein the gate controlled switching means are silicon controlled switches.

5. The converter of claim 4 wherein the half-wave rectification means comprise a plurality of diodes.

* * * * *